July 16, 1968  LE ROY D. GOLDFARB  3,392,930
POSITIONING MECHANISM FOR MOVING FILMS
Filed May 2, 1966
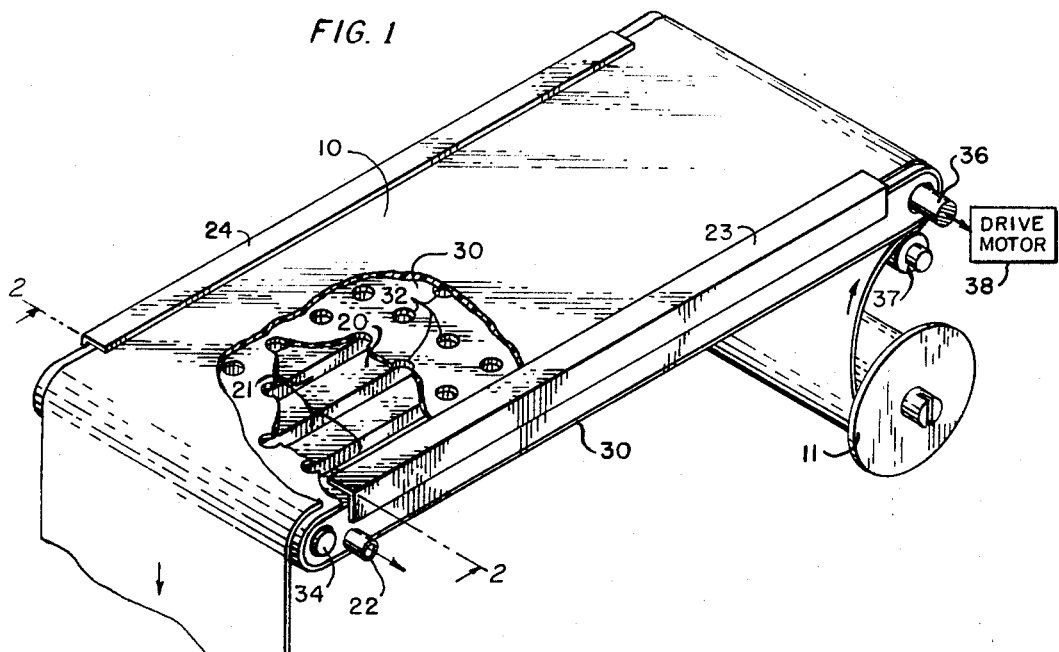
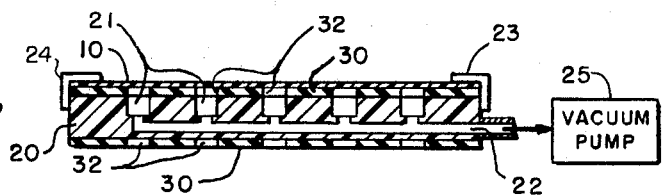
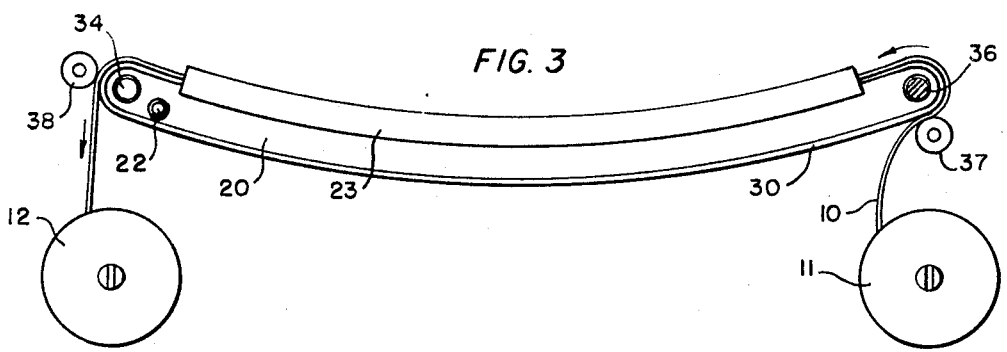
INVENTOR,
LE ROY D. GOLDFARB.
BY Harry M. Saragovitz,
Edward J. Kelly, Herbert Berl &
Julian C. Keppler  ATTORNEYS.

3,392,930
POSITIONING MECHANISM FOR MOVING FILMS
Le Roy D. Goldfarb, Freehold, N.J., assignor to the United States of America as represented by the Secretary of the Army
Filed May 2, 1966, Ser. No. 547,034
5 Claims. (Cl. 242—67.2)

ABSTRACT OF THE DISCLOSURE

A strip of film is moved across a given surface, defined by a platen. The film is held flat against a perforated, continuous belt and the belt is, in turn, held against the platen by vacuum pressure distributed along a series of slots in the surface of the platen. Movement of the perforated belt moves the film.

---

This invention relates to film transport and particularly to the accurate positioning of film in motion. More particularly this invention relates to the transport of a relatively-wide, flexible, roll-type film across a given area and maintaining the surface of the film in a specific plane in that given area.

There are many problems in the positioning of a relatively large area of flexible film, and particularly where motion of the film is involved. While film can be drawn flat, in the direction of motion, by counter-tension on take-up and feed reels, it is very hard to control warping or buckling of the film in the direction normal to the direction of motion. This problem is further aggravated by the distance between the supply and take-up reels, the width of the film, the thickness of the film, and the general characteristics of the film in regard to curving, etc.

A guide surface in the form of a platen or pressure plate can often be used on one side of the film, and the film can be drawn tight across the platen, but there is no assurance that the film will lie flat on the platen.

Slots or guides are effective for the edges but cannot correct any tendency for warping in the center portion. Applying more tension between the feed and take-up reels would be less practical for thinner films, and less effective for wider ones.

One of the means for holding the film flat against a given surface or platen is the use of vacuum techniques to draw the film tight against the platen. The vacuum may be applied directly over the entire surface of the film or through perforated or porous platen plates to distribute the pressure and hold the film flat and steady over the given area for any desired purpose. However, this system, while ideal for stationary film, induces a drag on a moving film that increases enormously with the area of the film that is under vacuum. In fact the point is soon reached where the strength of the film is not enough to overcome the drag of the vacuum.

Aside from actual breakage of the film there is the problem of stretching and distortion of the film material which could be very undesirable for precision work. If the vacuum is relieved for the purpose of moving the film to another position there is always the possibility of the film lifting to the point where the vacuum cannot be regained.

Also, in any case of moving film across a given surface, there is, in addition to the problems of friction, the danger of scratching which can permanently damage the rather delicate surface of certain films.

It is therefore an object of this invention to provide an improved transport mechanism that can accurately position films in a precise plane while at rest or in motion.

It is a further object of this invention to provide an improved film transport mechanism that does not require that stress be applied to the film in order to move it.

It is a further object of this invention to provide an improved mechanism for transporting film that eliminates friction between the film and the mechanism itself.

It is a further object of the invention to provide an improved film transport that can handle wider and thinner films, that can provide accurate positioning over a larger area, and that can transport films over a greater range of speeds with comparative safety.

These and other objects are accomplished by driving a perforated, continuous belt over a grooved platen. The film is fed to the surface of the belt above the platen and a vacuum is applied to the grooves of the platen to be transmitted, through the perforations in the belt, to draw the film tightly against the belt to conform to the shape of the surface of the platen while the belt is moved.

This invention will be better understood and other objects of this invention will become apparent from the following specification and the drawings, of which—

FIG. 1 is an isometric view of the mechanism with an exposed portion to illustrate the internal structure, FIG. 2 is a cross-section of the device, and FIG. 3 is a side view of another species of the invention.

Referring now more particularly to FIG. 1, an elongated film 10 is fed from a feed spool or reel 11 across a platen 20 whose surface is shaped to hold the film in the desired position.

The platen 20 has a series of grooves 21 evenly spaced over the surface of the platen. The grooves are all connected through a common vacuum channel 22, which is coupled to a vacuum pump 25, seen in FIG. 2.

A belt 30 also passes over the platen 20 under the film 10. This belt includes a plurality of perforations 32 which are juxtaposed with the grooves 21 as the belt moves along the platen. The belt turns on rollers 34 and 36 in a conventional way and one of the rollers may be turned by the drive motor 38.

The platen also includes a pair of film guides 23 and 24 on either side to hold the edges of the film down and guide the film and the belt along the desired path.

In operation, the film 10 is fed from the feed spool 11 over one of the rollers 36 and under the film guides 23 and 24 to be advanced along the surface of the perforated belt 30 to the end of the platen and over the second roller 34 to a take-up spool such as 12, which is shown in FIG. 3.

The vacuum pump 25 supplies a vacuum through the channel 22 to the grooves 21 and through the perforations 32 to the film 10. The vacuum draws down and holds the film and the belt against the platen to conform to the portion of its surface carrying the vacuum.

The film is held parallel to the surface of the platen, as long as the vacuum is sustained, whether the film is in motion or not.

The film is transported, either continuously or intermittently, by corresponding motion of the continuous belt.

The take-up spool 12 will, presumably, have a drive mechanism of a well known kind to provide a tension that is strong enough and constant enough to wind the film evenly on the take-up spool without damaging the film. Similarly, and according to well known practice in tape mechanisms the feed spool 11 should have sufficient drag to insure an even feed of the film to the roller and platen. Counter torque can also be provided by drive mechanism on the feed spool 11 in a well known manner if additional tension is desired or if it is desirable to rewind the film to its original feed spool 11 or to reverse direction of the film for any reason.

An idler roller such as 37 may be provided on one or both ends of the mechanism to hold the film in tight mechanical contact with the roller 36. This insures that the film will commence its motion across the platen evenly and that the vacuum, through the perforations, does not find an air leak at either end of the platen.

In FIG. 2 is a cross-section of the mechanism through the platen 20 along the vacuum channel 22. This clearly shows one way of cutting the grooves 21 into the platen along the direction of motion of the belt 30 and film 10. This also shows one way of applying vacuum from the pump 25 to the vacuum channel 22 and grooves 21.

The vacuum pump can be of any well known type and need only draw enough air to insure that the film is drawn quickly down to the perforated belt above the platen, and need only provide a degree of vacuum that will hold the film flat against the platen as it is moved across the plane of the platen. It is obvious that too much vacuum could distort the belt and the film and might, possibly, damage the film. Too much vacuum might also increase the friction of this device to an excessive amount.

FIG. 3 shows a side view of another species of this device to show another possible shape of the platen and film guide structure. Since the vacuum draws the film and belt down against the platen the film can be drawn into the concave surface shown, or could, conceivably, even be drawn into an undular, concave-convex surface arrangement that would be almost impossible to duplicate with the conventional guide systems.

While the platen illustrated in FIGS. 1 and 2 is provided with grooves along the axis of the motion of the film and belt it can be seen that the device is not limited to this particular configuration of grooves nor to any particular size or shape or number of grooves. The ultimate arrangement of these grooves as well as the cooperating perforations in the belt will be dictated by the characteristics of the belt and the film that is to be drawn across this device. For example, if the film is very, very thin and flexible the perforations should be small and relatively closely spaced and the grooves should be correspondingly narrow and closely spaced to distribute the vacuum pressure evenly over the film and to avoid large areas of pressure that would tend to distort the film, or even the belt.

Besides the variation in the size and placement of the perforations, it will also be obvious that there is no fixed shape of the perforations and that a porous belt could be substituted for the perforated belt. The obvious requirement in any case is that the vacuum must be transmitted from the platen through the belt and to the film to function properly. There must be little or no air leak through the outside edges of the belt, other than if desirable to stabilize the vacuum pressure, since air leaks would reduce the vacuum.

The belt may be of any desired thickness to insure the rigidity necessary to maintain the film in the desired plane. The belt must be of sufficient tensile strength to overcome the friction against the platen and to avoid significant strain or distortion that would be passed on to the film.

In regard to the grooves in the platen, these need not, necessarily, be uniformly placed across the platen but could be concentrated along the edges and at the ends of the platen where the possibility of air leaks would be greatest. The center portion needs only that amount of vacuum necessary to hold the central area of the film flat along the plane of the platen. Such variations might reduce the drag on the belt and improve the efficiency of the device.

It is also obvious that the grooves must be terminated at either end of the platen so that the vacuum is only applied through the perforations in the belt along the upper surface of the platen. No vacuum is applied to the belt as it passes over the rollers 34 and 36, or as it passes, under the device, back to the original roller 36. In this regard it should be noted that the return belt path and mechanical drive system can extend beyond that shown here to include other idlers, or belt-length and tension-compensating mechanisms, of well known kinds.

Also, the position of the feed and take-up spools or reels 11 and 12, and idler rollers 37 and 38, need not have the precise relationship to the platen shown here. These elements may be placed for the most effective mechanical function and to accommodate reels of film of any desired length.

Arrangement may also be included to release the vacuum and displace the film guides to remove the film from contact with the belt for the purposes of high speed take-up or rewind.

The drive motor 38 is shown connected to one end of the rollers 36 and it will be obvious that this drive motor must be of sufficient power to drag the belt across the platen under the pressures of vacuum that are necessary to hold the film in position. Suitable gearing may be provided to raise or lower the speed of the belt, and clutch or other control mechanisms should be provided where necessary to start and stop the motion of the rollers and belt, or to reverse them.

It is also obvious that the same or a second drive motor can be mechanically coupled to the other roller 34 for more positive driving or to overcome greater friction.

Friction may be further overcome by roughened, knurled, or rubber-coated surfaces of the rollers 34 and 36, or even by sprocket and teeth arrangements of a well known kind.

On the other hand, friction between the belt and the platen can be reduced by additional rollers, by the choice of minimum-friction surfaces on the inside of the belt and the upper surface of the platen, or by certain types of lubrication.

What is claimed is:

1. A positioning device for moving film comprising a platen having a grooved surface of a given shape, a perforated belt having an inner side and an outer side, a portion of said inner side being in slidable contact with said grooved surface of said platen, a portion of an elongated film positioned in contact with a portion of said outer side of said perforated belt opposing said grooved surface of said platen, and means for applying a vacuum to said grooves in said surface of said platen to draw said film and said belt to conform to said surface of said platen.

2. In a positioning device for moving film as in claim 1, means for moving said perforated belt with respect to said platen.

3. In a positioning device for moving film as in claim 1, said perforations in said belt corresponding to said grooves in said platen.

4. In a positioning device as in claim 1, means for feeding said elongated film to said perforated belt at one end of said platen and means for taking up said film as it leaves said perforated belt at the other end of said platen.

5. A positioning device for moving films comprising a platen having a given surface; a first cylindrical roller mounted at one end of said platen; a second cylindrical roller mounted at the other end of said platen; a continuous, perforated belt passing over said first and said second rollers; one portion of the underside of said perforated belt, between said first and second rollers, being in slidable contact with said given surface of said platen; a continuous roll of film, having a width substantially equal to the width of said belt and said platen; a feed spool, for said film, positioned adjacent to said one end of said platen; a take-up spool, for said film, positioned adjacent to said other end of said platen; a guide means for directing said film along the outer side of said platen between said feed spool and said take-up spool; means for rotating at least one of said cylindrical rollers to draw said perforated belt across said given surface of said platen; means for applying a torque on said take-up reel; a plurality of narrow, first channels cut into said given surface of said platen; a second channel in said platen connecting said plurality of said first channels; and vacuum pump means, coupled to said second channel for reducing the pressure of the air in said first and second channels to draw said film and said perforated belt into tight conformity with said surface of said platen.

References Cited

UNITED STATES PATENTS 3,321,121   5/1967   Nyberg et al. _____ 226—170

LEONARD D. CHRISTIAN, *Primary Examiner.*